INVENTOR.
ULRICH KNIPP
BY
ATTORNEY

United States Patent Office 3,015,283
Patented Jan. 2, 1962

3,015,283
GEAR PUMPS AND MOTORS
Ulrich Knipp, Leverkusen, Germany, assignor to Farbenfabriken Bayer Aktiengesellschaft, Leverkusen, Germany, a corporation of Germany
Filed Nov. 12, 1959, Ser. No. 852,566
Claims priority, application Germany Nov. 24, 1958
7 Claims. (Cl. 103—126)

This invention relates to hydraulic rotary gear pumps and hydraulic rotary motors and more particularly to gear wheels of synthetic plastic material for use in said pumps and motors.

In hydraulic rotary gear pumps and motors heretofore known, the gears have been fabricated from metals and also synthetic plastic material. However, in these devices the gears must be manufactured to within very close tolerances if a pump or motor having a high degree of efficiency is to be achieved. The gear wheels of this type of pump or motor are manufactured to have a diameter just slightly less than the diameter of the pump housing. To achieve such precision in the manufacture of the gears, considerable time and work are necessary.

Even after a considerable amount of time has been spent in manufacturing the gears to within the tolerances necessary, it is still practically impossible to achieve an absolutely satisfactory seal for the reason that when liquid which is passing through the pump or motor contacts the lateral walls of the housing and the end face of the gear wheel, the friction forces increase, thus increasing the sealing efficiency and simultaneously increasing the risk of seizure of the moving elements. The bearing clearance which is present in all gear type pumps also limits the degree of precision possible in fabricating the gear wheel, and thus adds an additional difficulty in achieving a satisfactory seal. Therefore, it can be seen that the overall efficiency of the gear motors and gear pumps heretofore known is limited by the clearance loss and the excessive friction between the moving parts of the apparatus so that the use of hydraulic gearing is also restricted.

It is, therefore, an object of this invention to provide improved sealing means for hydraulic motors and pumps. It is another object of this invention to provide gear wheels for rotary hydraulic pumps and motors which form a seal with the walls of the pumps and motors without being subject to binding due to the frictional forces. It is a further object of this invention to provide rotary hydraulic gear pumps and motors having a greater efficiency. It is still another object of this invention to provide gear wheels for rotary hydraulic pumps and motors which do not require manufacturing within the close tolerances of the heretofore known gear wheels. It is a still further object to provide gear wheels for rotary hydraulic motors and pumps which can be manufactured by simple casting techniques.

These and other objects of this invention will become apparent from the following description taken in accordance with the accompanying drawing throughout which like reference characters indicate like parts, which drawing forms a part of this application and in which.

Figure 1:
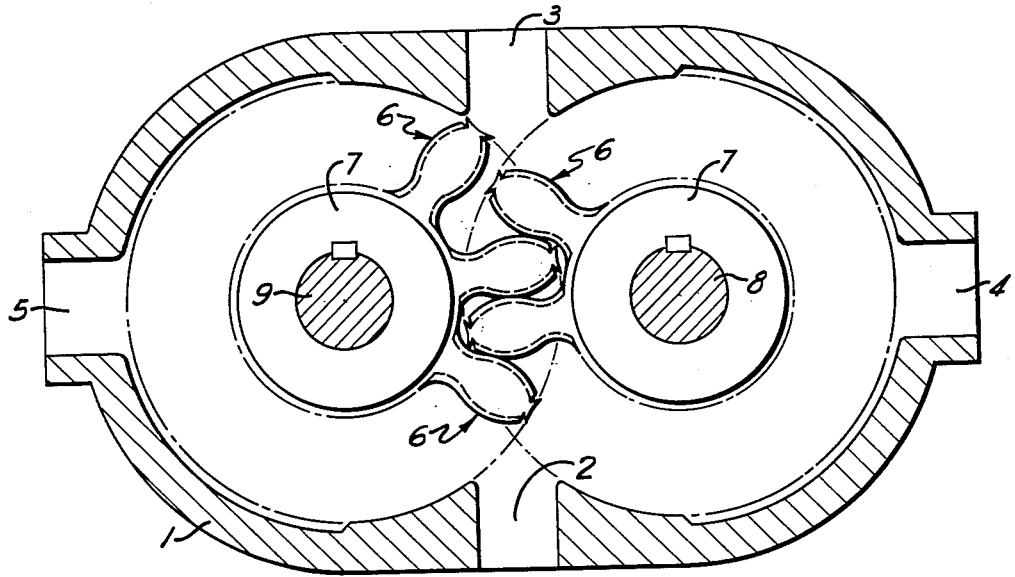
FIGURE 1 is a cross-sectional view of a gear motor in accordance with this invention.

The foregoing objects are accomplished in accordance with this invention, generally speaking, by providing gears having synthetic resilient plastic sealing lips, which are formed by grooves made in the teeth of the gear wheel on the surfaces adjacent to the internal walls of the housing of the pump or motor. These grooves are formed in the leading and trailing surfaces of the teeth adjacent the tooth crest and the side walls of the housing.

It has been found that by providing resilient gears having grooves in the limiting edges to form sealing lips which contact internal surfaces of the pump or motor housing, great precision and close tolerances are not required in the manufacture thereof. The precision in manufacturing the heretofore known gear wheels for pumping devices or motors is not required in the manufacture of the gear wheels of this invention for the reason that due to the resilience of the material from which the wheels are manufactured and also from the particular structure of the gear teeth, the dimensions of the gear wheel may be greater than the internal dimensions of the motor pump or housing.

The resiliency of the material from which the gear wheels are made permit the deformation of the teeth of the gear wheel when the teeth engage the walls of the housing and also when the teeth of a first gear become engaged with the teeth of a second gear contained within the housing. This feature insures a reliable seal, thus preventing the leakage of any liquid to unwanted areas of the pump. The sealing lips extending around the entire gear profile provide an excellent seal relative to the housing walls and on the other hand, due to the resilience of the material from which the gear is fabricated, the sealing lips compensate for inaccuracies in the tooth dimensions.

The gear wheels of this invention may be fabricated from any rubber-like resilient material such as, natural and synthetic rubbers, however, it is preferred to fabricate the gear wheels from polyurethane plastics because of the superior properties of this type of plastic. Other useful plastics for these purposes are polyamide resins. A particularly suitable polyurethane plastic is one having a Shore A hardness within the range of about 80 to about 96 and a resiliency of from about 45 to about 25. Although the chemistry of preparing polyurethane resins having the properties above described is not involved in the subject application, it is pointed out that polyurethane plastics may be prepared by reacting any suitable polyisocyanate with any suitable organic compound which exhibits a positive Zerewitinoff test containing at least two active hydrogen containing groups in the molecule which are reactive with isocyanate groups to form polyurethane plastics. Such plastic materials may be formed by procedures set forth in U.S. Patents 2,621,166, 2,620,516, 2,879,248, and 2,729,618.

In fabricating the gear wheels of the present invention the grooves may be cast directly into the body of the gear wheels by standard casting techniques during the formation of the gear itself, or the gear may first be made in a casting step and subsequently the grooves may be provided in the gear by machining operations or by other suitable techniques. By any of these methods, grooves are provided near the limiting edges of the gear teeth. Sealing lips result which make possible the gear pumps of this invention having greater efficiencies.

The gears of this invention may be entirely of a resilient plastic material or only partially of such a material, for example, the hub of the gear may be metallic with the teeth and a portion of the material around the hub being a resilient material, or the gear may be a metallic gear coated with a resilient material.

Referring more particularly to the drawing, FIGURE 1 shows a cross-sectional view of a hydraulic rotary motor in which gear wheels made in accordance with this invention are incorporated. The hydraulic motor is comprised of a housing 1 which has inlet openings 2 and 3 and outlets 4 and 5. The inlet openings 2 and 3 are used alternately depending upon the direction in which the output shafts 8 and 9 are to rotate. Of course, it is to be understood that although FIGURE 1 represents a fluid motor, it may also represent a hydraulic pump. In the embodiment of a fluid motor shown in FIGURE 1, hydraulic fluid such as, for example, oil flows under pressure from a fluid pump through the inlet opening 2 to drive the gear wheels 7 which in turn drive the output shafts 8 and 9. The hydraulic fluid then flows out the outlet openings 4 and 5 and back to the fluid pump (not shown). In the event it is desired to drive the output shafts 8 and 9 in the opposite direction, the opening 3 is utilized as the inlet. Of course, where an apparatus of this type is utilized as a pump, torque is applied to one of the shafts 8 or 9 which causes the fluid to be forced out of the outlet openings under pressure.

As can be seen in the drawing, the gear wheel 7 includes a plurality of radially extending teeth 6 which have longitudinally extending grooves 10 provided adjacent the crest of each of the teeth 6. These grooves 10 provide lips 12 which seal against the housing 1 of the fluid motor. The teeth 6 are also provided with peripheral extending grooves 11 adjacent the sides of the teeth 6 which may extend completely around the teeth 6 and around the portion between each of the teeth 6 or which may extend only the length of each tooth. Both the longitudinally extending grooves 10 in the crest of each tooth 6 and peripheral extending grooves 11 are provided in both the leading and trailing edges of each tooth.

Figure 2:
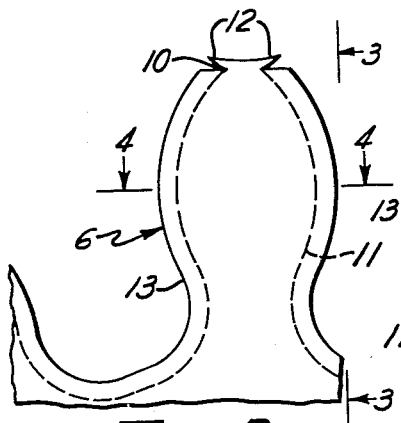
FIGURE 2 is a side elevation view of one of the teeth of a gear wheel made in accordance with one embodiment of this invention.

FIGURE 2 is a side elevation view of one embodiment showing one tooth 6 of a gear wheel in accordance with this invention. The tooth 6 is provided with longitudinally extending grooves 10 which form the sealing lips 12, the grooves 10 being adjacent the crest of the tooth 6. The tooth 6 is further provided with peripheral extending grooves 11 adjacent the sides of the gear wheel which form sealing lips 13. As shown in this embodiment, the peripheral grooves 11 extend not only around the teeth 6 but are continuous and extend along the base of the resilient plastic material between each of the teeth. Also as shown in FIGURE 2 both the longitudinally extending grooves 10 and the peripheral extending grooves 11 are provided in both the leading and trailing edges of each of the teeth 6.

Figure 3:
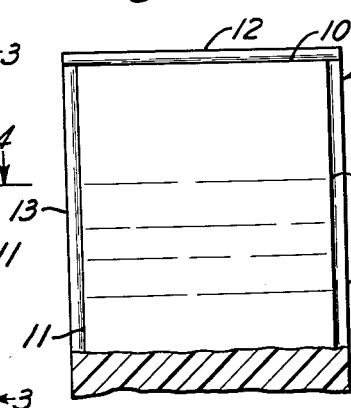
FIGURE 3 is a view taken along the lines 3—3 of FIGURE 2.

FIGURE 3 is a view of the gear tooth of FIGURE 2 taken along the line 3—3. This figure shows the longitudinally extending grooves 10 adjacent the crest of the gear 6 which form sealing lips 12 and the peripheral extending grooves 11 adjacent the sides of the gear which form sealing lips 13. As can be seen from this figure, the volume contained between each of the gear teeth 6 will be sealed on all sides because of the action of the sealing lips 12 and 13 against the internal walls of the housing 11 shown in FIGURE 1.

Figure 4:
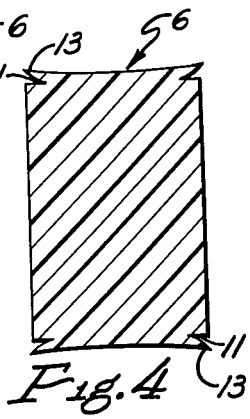
FIGURE 4 is a cross-sectional view taken along the lines 4—4 of FIGURE 2.

FIGURE 4 shows a cross-sectional view of the gear tooth 6 of FIGURE 2 taken along the lines 4—4. This figure shows the peripheral extending grooves 11 which form the sealing lips 13.

Figure 5:
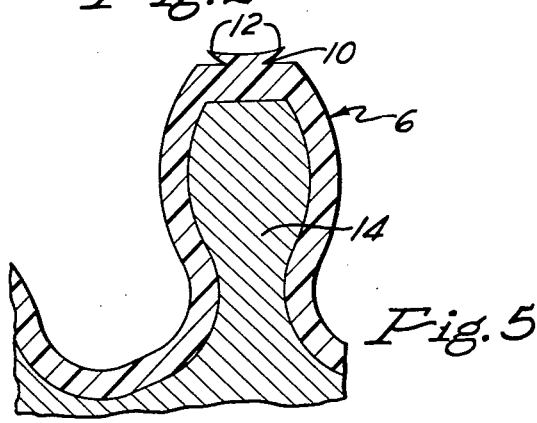
FIGURE 5 is a cross-sectional view similar to FIGURE 2 of another embodiment of this invention.

FIGURE 5 is a view similar to FIGURE 2 which illustrates another embodiment of this invention. As can be seen from FIGURE 4 the entire gear wheel 7 is formed from a solid piece of a synthetic resilient plastic material. In the embodiment shown in FIGURE 5 the gear wheel comprises a core member 14 which may be rough cast having an outer layer of a resilient plastic material. This structure can be fabricated by first forming the core member 14 having the general shape of the gear desired, placing the core member in a mold having an internal configuration which will produce a gear in accordance with this invention and filling the space between the core and the mold with a resilient plastic such as polyurethane. If desired, the core member may be provided with an adhesive, but generally a sufficient bond between the metal core member and resilient plastic material will result by casting the resilient material directly over the core member.

As stated previously, the preferred material is a polyurethane plastic. It is within the scope of this invention to provide the plastic material with known fillers and other materials, if desired. Also in order to further reduce the friction between the walls of the housing and the gear teeth 6, the polyurethane plastic may containing solid lubricants such as, for example, graphite or molybdenum disulfide. A suitable polyurethane containing molybdenum disulfide is that material described and claimed in Canadian Letters Patent No. 580,173.

Although the invention has been described in considerable detail in the foregoing, in order to properly illustrate the invention, it is to be understood that the purpose of such detail is solely to illustrate the embodiments of the invention and that modification can be made by those skilled in the art without departing from the spirit and scope of the invention as set forth in the claims.

What is claimed is:

1. A gear of a resilient material for use in hydraulic pumps and motors comprising a hub portion and a plurality of tooth-like members radially extending from said hub portion, said gear having two substantially parallel side surfaces which determine the thickness of said gear, said tooth-like members each being defined by said two side surfaces, a leading surface and a trailing surface which meet at the radially outermost position of said gear to form a crest portion which extends the thickness of said gear, a longitudinal groove in each of said leading and trailing surfaces adjacent said crest portion extending the thickness of said gear to provide a sealing lip, and a pair of grooves adjacent said side surfaces of each of said tooth-like members extending from the longitudinal groove in the leading surface of one of said tooth-like members to the longitudinal groove in the trailing surface of the adjacent tooth-like member to form circumferentially extending sealing lips.

2. The gear of claim 1 in which the rubber-like material is a polyurethane plastic having a Shore A hardness of from about 80 to about 96 and a resiliency of from about 45 to about 25.

3. A gear of a resilient material for use in hydraulic pumps and motors comprising a hub portion and a plurality of tooth-like members radially extending from said hub portion, said gear having two substantially parallel side surfaces which determine the thickness of said gear, said tooth-like members each being defined by said two side surfaces, a leading surface and a trailing surface which meet at the radially outermost position of said gear to form a crest portion which extends the thickness of said gear, a longitudinal groove in each of said leading and trailing surfaces adjacent said crest portion extending the thickness of said gear to provide a sealing lip, and a pair of grooves in said leading and trailing surfaces adjacent said side surfaces in each of said tooth-like members extending at least the radial length of said tooth-like members to form sealing lips.

4. A gear for use in hydraulic gear pumps and motors comprising a metallic inner core and an outer layer of rubber-like resilient material, a hub portion and a plurality of tooth-like members radially extending from said hub portion, said gear having two substantially parallel side surfaces which determine the thickness of said gear, said tooth-like members each being defined by said two side surfaces, a leading surface and a trailing surface which meet at the radially outermost position of said gear to form a crest portion which extends the thickness of said gear, a longitudinal groove in each of said leading and trailing surfaces adjacent said crest portion extending the thickness of said gear to provide a sealing lip, and a pair of grooves adjacent said side surfaces of each of said tooth-like members extending from the longitudinal groove in the leading surface of one of said tooth-like members to the longitudinal groove in the trailing surface of the adjacent tooth-like member to form circumferentially extending sealing lips.

5. A gear for use in hydraulic gear pumps and motors comprising a metallic inner core and an outer layer of rubber-like resilient material, a hub portion and a plurality of tooth-like members radially extending from said hub portion, said gear having two substantially parallel side surfaces which determine the thickness of said gear, said tooth-like members each being defined by said two side surfaces, a leading surface and a trailing surface which meet at the radially outermost position of said gear to form a crest portion which extends the thickness of said gear, a longitudinal groove in each of said leading and trailing surfaces adjacent said crest portion extending the thickness of said gear to provide a sealing lip and a pair of grooves in said leading and trailing surfaces adjacent said side surfaces of each of said tooth-like members extending at least the radial length of said tooth-like members to form sealing lips.

6. In hydraulic pumps and motors having a housing enclosing a chamber, said housing including inlet and outlet means, said chamber accommodating a closely fitting rotatively mounted gear, the improvement which comprises said gear being a resilient rubber-like material and having a hub portion and a plurality of tooth-like members radially extending from said hub portion, said gear having two substantially parallel side surfaces which determine the thickness of said gear, said tooth-like members each being defined by said two side surfaces, a leading surface and a trailing surface which meet at the radially outermost position of said gear to form a crest portion which extends the thickness of said gear, a longitudinal groove in each of said leading and trailing surfaces adjacent said crest portion extending the thickness of said gear to provide a sealing lip, and a pair of grooves adjacent said side surfaces of each of said tooth-like members extending from the longitudinal groove in the leading surface of one of said tooth-like members to the longitudinal groove in the trailing surface of the adjacent tooth-like member to form circumferentially extending sealing lips.

7. In hydraulic pumps and motors having a housing enclosing a chamber, said housing including inlet and outlet means, said chamber accommodating a closely fitting rotatively mounted gear, the improvement which comprises said gear being a resilient rubber-like material and having a hub portion and a plurality of tooth-like members radially extending from said hub portion, said gear having two substantially parallel side surfaces which determine the thickness of said gear, said tooth-like members each being defined by said two side surfaces, a leading surface and a trailing surface which meet at the radially outermost position of said gear to form a crest portion which extends the thickness of said gear, a longitudinal groove in each of said leading and trailing surfaces adjacent said crest portion extending the thickness of said gear to provide a sealing lip, and a pair of grooves in said leading and trailing surfaces adjacent said side surfaces of each of said tooth-like members extending at least the radial length of said tooth-like members to form sealing lips.

References Cited in the file of this patent
UNITED STATES PATENTS

| | | |
|---|---|---|
| 630,932 | Rock | Aug. 15, 1899 |
| 870,311 | Okamoto | Nov. 5, 1907 |
| 2,258,371 | Wernert | Oct. 7, 1941 |
| 2,286,031 | Bowering | June 9, 1942 |
| 2,403,796 | Hana | July 9, 1946 |
| 2,460,952 | Simer et al. | Feb. 8, 1949 |
| 2,567,699 | Devlin | Sept. 11, 1951 |
| 2,633,083 | Smith | Mar. 31, 1953 |
| 2,644,402 | Lehman | July 7, 1953 |
| 2,697,402 | Lindquist | Dec. 21, 1954 |
| 2,848,952 | Wakeman | Aug. 26, 1958 |